US008425218B2

(12) United States Patent
Pettis

(10) Patent No.: US 8,425,218 B2
(45) Date of Patent: *Apr. 23, 2013

(54) NETWORKED THREE-DIMENSIONAL PRINTING

(75) Inventor: Nathaniel B. Pettis, Brooklyn, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/348,728

(22) Filed: Jan. 12, 2012

(65) Prior Publication Data

US 2012/0113473 A1 May 10, 2012

Related U.S. Application Data

(63) Continuation of application No. 13/314,337, filed on Dec. 8, 2011, which is a continuation-in-part of application No. 12/858,622, filed on Aug. 18, 2010, now Pat. No. 8,282,380.

(51) Int. Cl.
*B29C 41/02* (2006.01)
*B29C 35/08* (2006.01)
*G06F 3/12* (2006.01)

(52) U.S. Cl.
USPC .......... 425/150; 264/40.1; 264/308; 264/401; 700/98; 700/118

(58) Field of Classification Search .................. 425/135, 425/150, 174.4, 375; 264/40.1, 401, 308; 700/98, 118, 204
See application file for complete search history.

(56) References Cited

U.S. PATENT DOCUMENTS

| 4,097,566 | A | 6/1978 | Bertin et al. |
| 5,192,559 | A | 3/1993 | Hull et al. |
| 5,637,175 | A | 6/1997 | Feygin et al. |
| 5,730,817 | A | 3/1998 | Feygin et al. |
| 6,129,872 | A | 10/2000 | Jang |
| 6,841,116 | B2 | 1/2005 | Schmidt |
| 7,168,935 | B1 * | 1/2007 | Taminger et al. .......... 425/174.4 |
| 8,282,380 | B2 | 10/2012 | Pax et al. |
| 8,286,236 | B2 * | 10/2012 | Jung et al. ........................ 726/21 |
| 2004/0232601 | A1 | 11/2004 | Kundinger et al. |
| 2006/0041443 | A1 * | 2/2006 | Horvath ............................ 705/1 |
| 2006/0192315 | A1 | 8/2006 | Farr et al. |
| 2008/0018018 | A1 | 1/2008 | Nielsen et al. |
| 2011/0029591 | A1 * | 2/2011 | Wood et al. ................... 709/203 |
| 2012/0046779 | A1 | 2/2012 | Pax et al. |
| 2012/0092724 | A1 | 4/2012 | Pettis |

(Continued)

OTHER PUBLICATIONS

Onagoruwa, Seyi et al., "Fused Deposition of Ceramics (FDC) and Composites", School of Mechanical and Materials Engineering Washington State University Pullman, WA 99164-2920 amitband@wsu.edu 2001 , 224-231.

(Continued)

*Primary Examiner* — Joseph S Del Sole
*Assistant Examiner* — Nahida Sultana
(74) *Attorney, Agent, or Firm* — Strategic Patents, P.C.

(57) ABSTRACT

Three-dimensional fabrication resources are improved by adding networking capabilities to three-dimensional printers and providing a variety of tools for networked use of three-dimensional printers. Web-based servers or the like can provide a single point of access for remote users to manage access to distributed content on one hand, and to manage use of distributed fabrication resources on the other.

18 Claims, 6 Drawing Sheets

U.S. PATENT DOCUMENTS

| | | |
|---|---|---|
| 2012/0105903 A1 | 5/2012 | Pettis |
| 2012/0113457 A1 | 5/2012 | Pettis |
| 2012/0280415 A1 | 11/2012 | Halford |
| 2012/0286453 A1 | 11/2012 | Pettis |
| 2012/0287259 A1 | 11/2012 | Pettis |
| 2012/0287459 A1 | 11/2012 | Pettis |
| 2012/0287470 A1 | 11/2012 | Pettis |
| 2012/0287472 A1 | 11/2012 | Pettis |
| 2012/0287473 A1 | 11/2012 | Pettis |

OTHER PUBLICATIONS

"Fabbaloo Personal Manufacturing and 3D Printing, http://fabbaloo.com/blog/2012/1/6/kraftwurxs-patent-available.html", http://fabbaloo.com/blog/2012/1/6/kraftwurxs-patent-available.html Jan. 29, 2012, all.

Pax, Charles E., "Awesome August Hack-a-thon", http://charlespax.com/2009/08/18/awesome-august-hack-a-thon/[Aug. 5, 2010 12:13:01 PM] Open Source 3D printing research and design Aug. 18, 2009, all.

Pax, Charles E., "Motorized Conveyor Belt Sneak Peak", http://charlespax.com/2010/04/27/motorized-conveyor-belt-sneak-peek/ Open Source 3D printing research and design Apr. 27, 2010, 1-10.

Pax, Charles E., "MakerBot Thoughts", http://charlespax.com/2009/04/22/makerbot-thoughts/[Aug. 5, 2010 12:10:55 PM] Open Source 3D printing research and design Apr. 22, 2009, all.

Pax, Charles E., "Heated Conveyor Belt Build Platform", http://charlespax.com/2010/04/20/heated-conveyor-belt-build-platform/ [Aug. 5, 2010 12:17:26 PM] Open Source 3D printing research and design Apr. 20, 2010, 1-3.

Brockmeier, Oivind, "Automated Loading and Unloading of the Stratasys FDM 1600 Rapid Prototyping System", Thesis submitted to the Faculty of Virginia Polytechnic Institute and State University Mar. 2000, all.

Pax, Charles E., "MakerBot Conveyor Belt", http://charlespax.com/2010/03/17/makerbot-conveyor-belt/[Aug. 5, 2010 12:14:05 PM] Open Source 3D printing research and design Mar. 17, 2010, all.

Pax, Charles E., "MakerBot Thoughts 3", http://charlespax.com/2010/01/27/makerbot-thoughts-3/[Aug. 5, 2010 12:13:39 pm] Open Source 3D printing research and design Jan. 27, 2010, all.

"U.S. Appl. No. 12/858,622, Non-Final Office Action mailed Feb. 14, 2012", , 21.

"U.S. Appl. No. 12/858,622 Notice of Allowance mailed Aug. 2, 2012", SN:12858622 NPL-17 Aug. 2, 2012, 13 pages.

"U.S. Appl. No. 13/348,863 Non-Final Office Action mailed Jan. 18, 2012", NPL-24, 14 pgs.

"U.S. Appl. No. 13/348,896 Non-Final Office Action mailed Jan. 22, 2013", SN13348896-012213 NPL-26, 16 pages.

"U.S. Appl. No. 13/348,863, Notice of Allowance mailed Feb. 11, 2013", NPL-27, 7 pages.

* cited by examiner

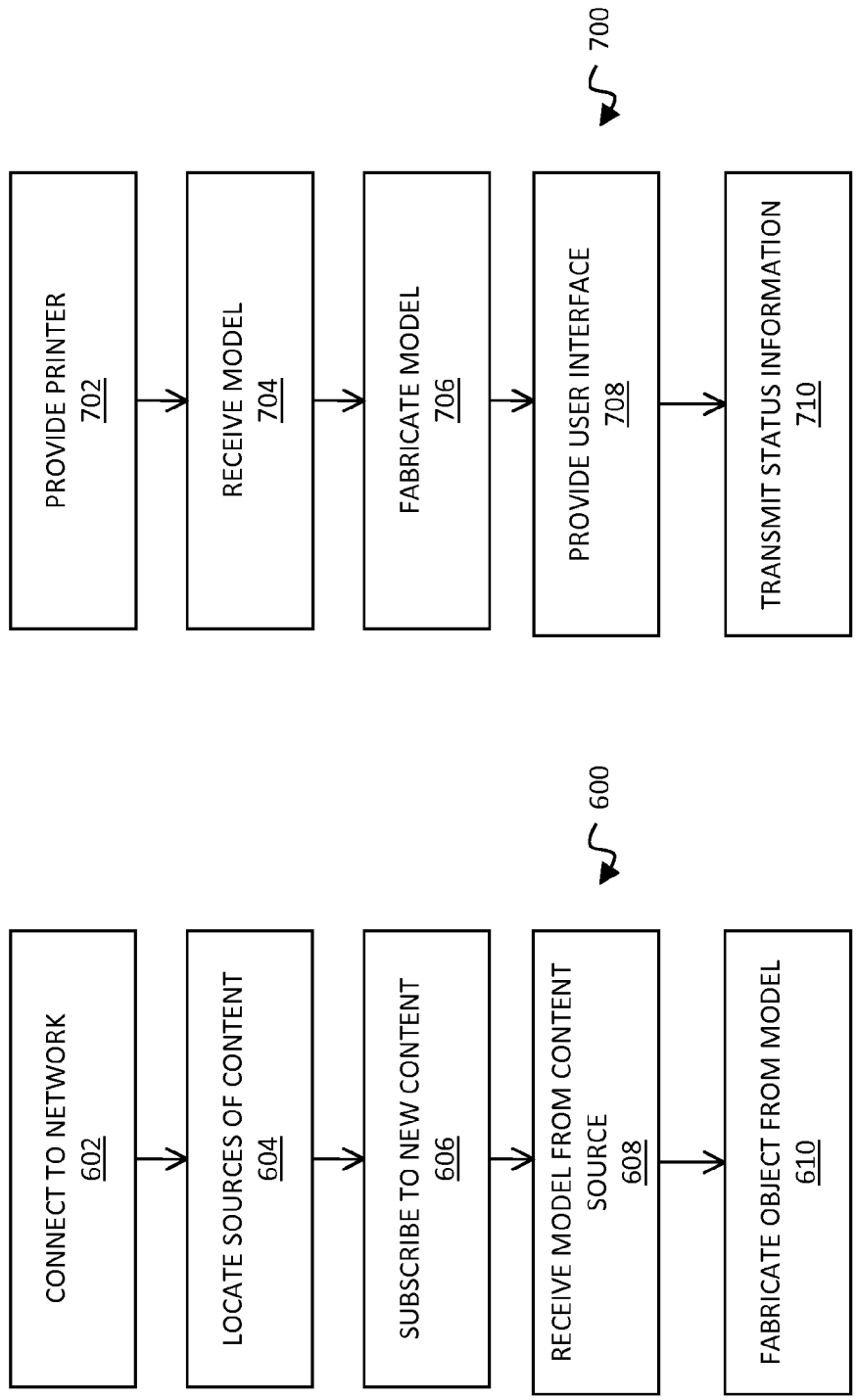

NETWORKED THREE-DIMENSIONAL PRINTING

RELATED APPLICATIONS

This application is a continuation of U.S. patent application Ser. No. 13/314,337 filed Dec. 8, 2011, which is a continuation-in-part of U.S. patent application Ser. No. 12/858,622, filed on Aug. 18, 2010, the entire content of each of these applications is hereby incorporated by reference.

BACKGROUND

The invention relates to three-dimensional fabrication using networked resources.

A variety of three-dimensional fabrication techniques have been devised to support rapid prototyping from computer models. These techniques have been refined over the years to increase accuracy, working volume, and the variety of build materials available in a rapid prototyping environment. While these increasingly sophisticated and expensive machines appear regularly in commercial design and engineering settings, a more recent trend has emerged toward low-cost three-dimensional prototyping devices suitable for hobbyists and home users. As these resources become more readily and widely available, a need has emerged for networking capabilities and network management for three-dimensional printers.

SUMMARY

Three-dimensional fabrication resources are improved by adding networking capabilities to three-dimensional printers and providing a variety of tools for networked use of three-dimensional printers. Web-based servers or the like can provide a single point of access for remote users to manage access to distributed content on one hand, and to manage use of distributed fabrication resources on the other.

BRIEF DESCRIPTION OF THE DRAWINGS

The foregoing and other objects, features and advantages of the invention will be apparent from the following description of particular embodiments thereof, as illustrated in the accompanying drawings. The drawings are not necessarily to scale, emphasis instead being placed upon illustrating the principles of the invention.

FIG. 6 is a flowchart of a method for operating a three-dimensional printer coupled to a network.

FIG. 7 is a flowchart of a method for operating a three-dimensional printer coupled to a network.

DETAILED DESCRIPTION

Described herein are devices and methods for using networked three-dimensional printers. It will be understood that while the exemplary embodiments below emphasize fabrication techniques using extrusion, the principles of the invention may be adapted to a wide variety of three-dimensional fabrication processes, and in particular additive fabrication processes including without limitation selective laser sintering, fused deposition modeling, three-dimensional printing, and the like. All such variations that can be adapted to use with a networked fabrication resource as described herein are intended to fall within the scope of this disclosure. It should also be understood that any reference herein to a fabrication process such as printing or three-dimensional printing is intended to refer to any and all such additive fabrication process unless a different meaning is explicitly stated or otherwise clear from the context. Thus by way of example and not of limitation, a three-dimensional printer (or simply "printer") is now described that may be used in a networked three-dimensional printing environment.

Figure 1:
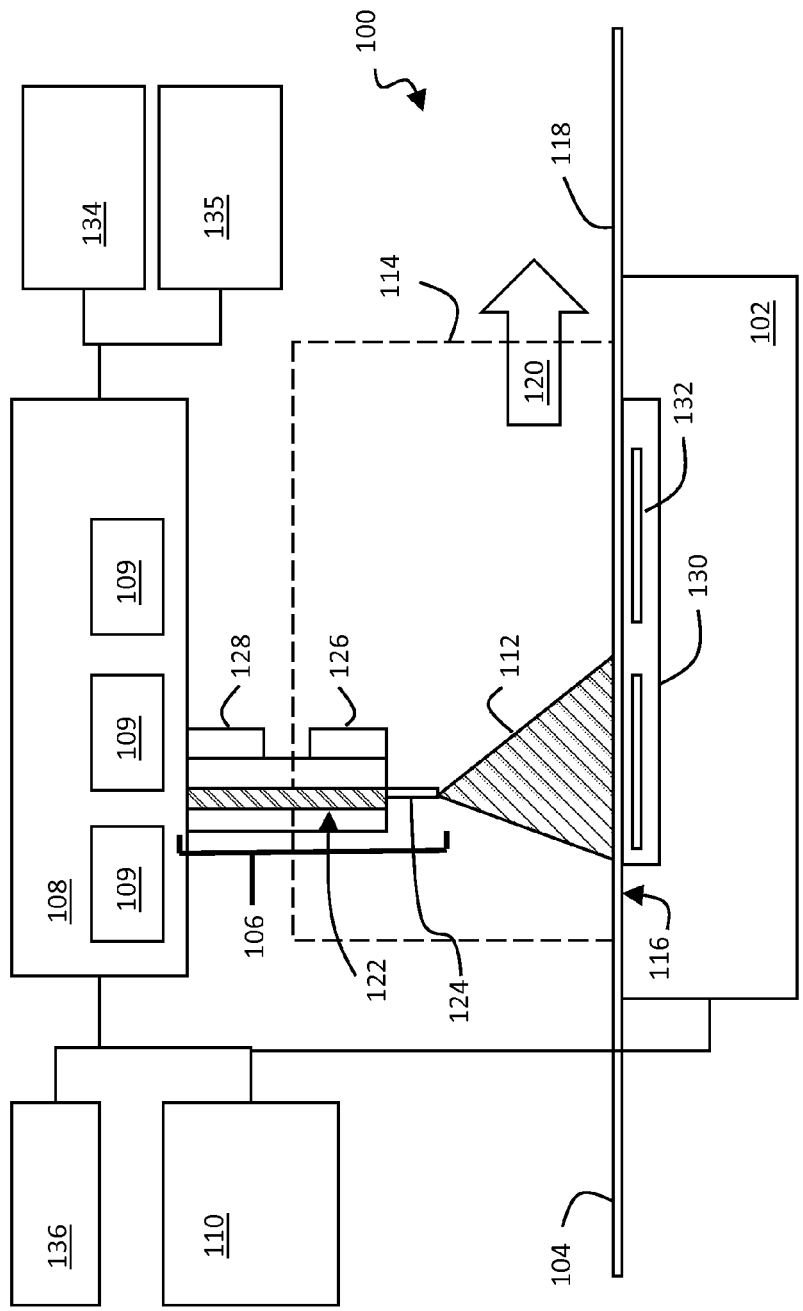
FIG. 1 is a block diagram of a three-dimensional printer.

FIG. 1 is a block diagram of a three-dimensional printer. In general, the printer 100 may include a build platform 102, a conveyer 104, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may support the conveyer 104 in order to provide a fixed, dimensionally and positionally stable platform on which to build the object 112.

The build platform 102 may include a thermal element 130 that controls the temperature of the build platform 102 through one or more active devices 132 such as resistive elements that convert electrical current into heat, Peltier effect devices that can create a heating or cooling effect, or any other thermoelectric heating and/or cooling devices. Thus the thermal element 130 may be a heating element that provides active heating to the build platform 102, a cooling element that provides active cooling to the build platform 102, or a combination of these. The heating element 130 may be coupled in a communicating relationship with the controller 110 in order for the controller 110 to controllably impart heat to or remove heat from the surface 116 of the build platform 102. Thus the thermal element 130 may include an active cooling element positioned within or adjacent to the build platform 102 to controllably cool the build platform 102.

It will be understood that a variety of other techniques may be employed to control a temperature of the build platform 102. For example, the build platform 102 may use a gas cooling or gas heating device such as a vacuum chamber or the like in an interior thereof, which may be quickly pressurized to heat the build platform 102 or vacated to cool the build platform 102 as desired. As another example, a stream of heated or cooled gas may be applied directly to the build platform 102 before, during, and/or after a build process. Any device or combination of devices suitable for controlling a temperature of the build platform 102 may be adapted to use as the thermal element 130 described herein.

The conveyer 104 may be formed of a sheet 118 of material that moves in a path 120 through the working volume 114. Within the working volume 114, the path 120 may pass proximal to the surface 116 of the build platform 102—that is, resting directly on or otherwise supported by the surface 116—in order to provide a rigid, positionally stable working surface for a build. It will be understood that while the path 120 is depicted as a unidirectional arrow, the path 120 may be bidirectional, such that the conveyer 104 can move in either of two opposing directions through the working volume 114. It will also be understood that the path 120 may curve in any of a variety of ways, such as by looping underneath and around the build platform 102, over and/or under rollers, or around delivery and take up spools for the sheet 118 of material. Thus, while the path 120 may be generally (but not necessarily) uniform through the working volume 114, the conveyer 104 may move in any direction suitable for moving completed items from the working volume 114. The conveyor may include a motor or other similar drive mechanism (not shown) coupled to the controller 110 to control movement of the sheet 118 of material along the path 120. Various drive mechanisms are shown and described in further detail below.

In general, the sheet 118 may be formed of a flexible material such as a mesh material, a polyamide, a polyethylene terephthalate (commercially available in bi-axial form as MYLAR), a polyimide film (commercially available as KAPTON), or any other suitably strong polymer or other material. The sheet 118 may have a thickness of about three to seven thousandths of an inch, or any other thickness that permits the sheet 118 to follow the path 120 of the conveyer 104. For example, with sufficiently strong material, the sheet 118 may have a thickness of one to three thousandths of an inch. The sheet 118 may instead be formed of sections of rigid material joined by flexible links.

A working surface of the sheet 118 (e.g., an area on the top surface of the sheet 118 within the working volume 114) may be treated in a variety of manners to assist with adhesion of build material to the surface 118 and/or removal of completed objects from the surface 118. For example, the working surface may be abraded or otherwise textured (e.g., with grooves, protrusions, and the like) to improve adhesion between the working surface and the build material.

A variety of chemical treatments may be used on the working surface of the sheet 118 of material to further facilitate build processes as described herein. For example, the chemical treatment may include a deposition of material that can be chemically removed from the conveyer 104 by use of water, solvents, or the like. This may facilitate separation of a completed object from the conveyer by dissolving the layer of chemical treatment between the object 112 and the conveyer 104. The chemical treatments may include deposition of a material that easily separates from the conveyer such as a wax, mild adhesive, or the like. The chemical treatment may include a detachable surface such as an adhesive that is sprayed on to the conveyer 104 prior to fabrication of the object 112.

In one aspect, the conveyer 104 may be formed of a sheet of disposable, one-use material that is fed from a dispenser and consumed with each successive build.

In one aspect, the conveyer 104 may include a number of different working areas with different surface treatments adapted for different build materials or processes. For example, different areas may have different textures (smooth, abraded, grooved, etc.). Different areas may be formed of different materials. Different areas may also have or receive different chemical treatments. Thus a single conveyer 104 may be used in a variety of different build processes by selecting the various working areas as needed or desired.

The extruder 106 may include a chamber 122 in an interior thereof to receive a build material. The build material may, for example, include acrylonitrile butadiene styrene ("ABS"), high-density polyethylene ("HDPL"), polylactic acid, or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 to melt thermoplastic or other meltable build materials within the chamber 122 for extrusion through an extrusion tip 124 in liquid form. While illustrated in block form, it will be understood that the heater 124 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 to melt the build material for extrusion. The extruder 106 may also or instead include a motor 128 or the like to push the build material into the chamber 122 and/or through the extrusion tip 126.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure. As noted above, other techniques may be employed for three-dimensional printing, including extrusion-based techniques using a build material that is curable and/or a build material of sufficient viscosity to retain shape after extrusion.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and so forth. Any such arrangement suitable for controllably positioning the extruder 106 within the working volume 114 may be adapted to use with the printer 100 described herein.

By way of example and not limitation, the conveyor 104 may be affixed to a bed that provides x-y positioning within the plane of the conveyor 104, while the extruder 106 can be independently moved along a z-axis. As another example, the extruder 106 may be stationary while the conveyor 104 is x, y, and z positionable. As another example, the extruder 106 may be x, y, and z positionable while the conveyer 104 remains fixed (relative to the working volume 114). In yet another example, the conveyer 104 may, by movement of the sheet 118 of material, control movement in one axis (e.g., the y-axis), while the extruder 106 moves in the z-axis as well as one axis in the plane of the sheet 118. Thus in one aspect, the conveyor 104 may be attached to and move with at least one of an x-axis stage (that controls movement along the x-axis), a y-axis stage (that controls movement along a y-axis), and a z-axis stage (that controls movement along a z-axis) of the x-y-z positioning assembly 108. More generally, any arrangement of motors and other hardware controllable by the controller 110 may serve as the x-y-z positioning assembly 108 in the printer 100 described herein. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically coupled in a communicating relationship with the build platform 102, the conveyer 104, the x-y-z positioning assembly 108, and the other various components of the printer 100. In general, the controller 110 is operable to control the components of the printer 100, such as the build platform 102, the conveyer 104, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, the controller 110 may include a microprocessor or other processing circuitry with sufficient computational power to provide related functions such as executing an operating system, providing a graphical user interface (e.g., to a display coupled to the controller 110 or printer 100), convert three-dimensional models into tool instructions, and operate a web server or otherwise host remote users and/or activity through the network interface 136 described below.

A variety of additional sensors may be usefully incorporated into the printer 100 described above. These are generically depicted as sensor 134 in FIG. 1, for which the positioning and mechanical/electrical interconnections with other elements of the printer 100 will depend upon the type and purpose of the sensor 134 and will be readily understood and appreciated by one of ordinary skill in the art. The sensor 134 may include a temperature sensor positioned to sense a temperature of the surface of the build platform 102. This may, for example, include a thermistor or the like embedded within or attached below the surface of the build platform 102. This may also or instead include an infrared detector or the like directed at the surface 116 of the build platform 102 or the sheet 118 of material of the conveyer 104. Other sensors that may be usefully incorporated into the printer 100 as the sensor 134 include a heat sensor, a volume flow rate sensor, a weight sensor, a sound sensor, and a light sensor. Certain more specific examples are provided below by way of example and not of limitation.

The sensor 134 may include a sensor to detect a presence (or absence) of the object 112 at a predetermined location on the conveyer 104. This may include an optical detector arranged in a beam-breaking configuration to sense the presence of the object 112 at a location such as an end of the conveyer 104. This may also or instead include an imaging device and image processing circuitry to capture an image of the working volume 114 and analyze the image to evaluate a position of the object 112. This sensor 134 may be used for example to ensure that the object 112 is removed from the conveyor 104 prior to beginning a new build at that location on the working surface such as the surface 116 of the build platform 102. Thus the sensor 134 may be used to determine whether an object is present that should not be, or to detect when an object is absent. The feedback from this sensor 134 may be used by the controller 110 to issue processing interrupts or otherwise control operation of the printer 100.

The sensor 134 may include a sensor that detects a position of the conveyer 104 along the path. This information may be obtained from an encoder in a motor that drives the conveyer 104, or using any other suitable technique such as a visual sensor and corresponding fiducials (e.g., visible patterns, holes, or areas with opaque, specular, transparent, or otherwise detectable marking) on the sheet 118.

The sensor 134 may include a heater (instead of or in addition to the thermal element 130) to heat the working volume 114 such as a radiant heater or forced hot air to maintain the object 112 at a fixed, elevated temperature throughout a build. The sensor 134 may also or instead include a cooling element to maintain the object 112 at a predetermined sub-ambient temperature throughout a build.

The sensor 134 may also or instead include at least one video camera. The video camera may generally capture images of the working volume 114, the object 112, or any other hardware associated with the printer 100. The video camera may provide a remote video feed through the network interface 136, which feed may be available to remote users through a user interface maintained by, e.g., remote hardware such as the print servers described below with reference to FIG. 3, or within a web page provided by a web server hosted by the three-dimensional printer 100. Thus in one aspect there is disclosed herein a user interface adapted to present a video feed from at least one video camera of a three-dimensional printer to a remote user through a user interface.

The sensor 134 may include may also include more complex sensing and processing systems or subsystems, such as a three-dimensional scanner using optical techniques (e.g., stereoscopic imaging, or shape from motion imaging), structured light techniques, or any other suitable sensing and processing hardware that might extract three-dimensional information from the working volume 114. In another aspect, the sensor 134 may include a machine vision system that captures images and analyzes image content to obtain information about the status of a job, working volume 114, or an object 112 therein. The machine vision system may support a variety of imaging-based automatic inspection, process control, and/or robotic guidance functions for the three-dimensional printer 100 including without limitation pass/fail decisions, error detection (and corresponding audible or visual alerts), shape detection, position detection, orientation detection, collision avoidance, and so forth.

Other components, generically depicted as other hardware 135, may also be included, such as input devices including a keyboard, touchpad, mouse, switches, dials, buttons, motion sensors, and the like, as well as output devices such as a display, a speaker or other audio transducer, light emitting diodes, and so forth. Other hardware 135 may also or instead include a variety of cable connections and/or hardware adapters for connecting to, e.g., external computers, external hardware, external instrumentation or data acquisition systems, and so forth.

The printer 100 may include, or be connected in a communicating relationship with, a network interface 136. The network interface 136 may include any combination of hardware and software suitable for coupling the controller 110 and other components of the printer 100 to a remote computer in a communicating relationship through a data network. By way of example and not limitation, this may include electronics for a wired or wireless Ethernet connection operating according to the IEEE 802.11 standard (or any variation thereof), or any other short or long range wireless networking components or the like. This may include hardware for short range data communications such as BlueTooth or an infrared transceiver, which may be used to couple into a local area network or the like that is in turn coupled to a data network such as the Internet. This may also or instead include hardware/software for a WiMax connection or a cellular network connection (using, e.g., CDMA, GSM, LTE, or any other suitable protocol or combination of protocols). Consistently, the controller 110 may be configured to control participation by the printer 100 in any network to which the network interface 136 is connected, such as by autonomously connecting to the network to retrieve printable content, or responding to a remote request for status or availability. Networked uses of the printer 100 are discussed in greater detail below.

Figure 2:
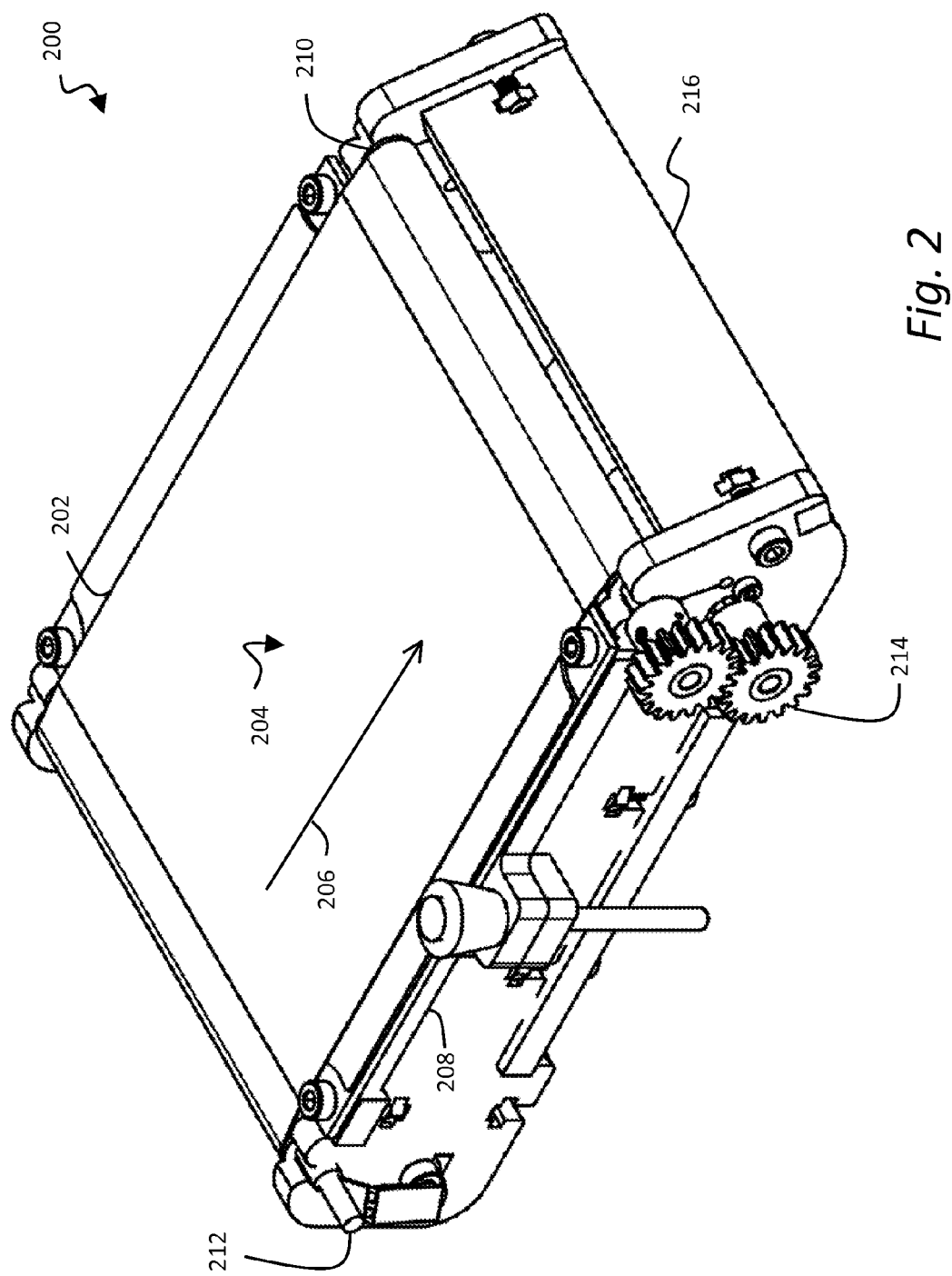
FIG. 2 is an isometric view of a conveyer for an automated build process.

FIG. 2 is an isometric view of a conveyer for an automated build process. The conveyer 200 may include a sheet 202 of material that provides a working surface 204 for three-dimensional fabrication. As depicted, the conveyer may form a continuous path 206 about a build platform 208 by arranging the sheet 202 as a belt or the like. Thus for example, the path 206 may move parallel to the surface of the build platform 208 along the top of the build platform 208 (from left to right in FIG. 2). The sheet 202 may then curve downward and around a roller 210 and reverse direction underneath the build platform 208, returning again at an opposing roller 212 to form a loop about the build platform 208.

The roller 210 may be coupled by gears 214 or the like to a motor (not shown) to move the sheet 202 of material. The motor may be controlled by a controller (such as the controller 110 described above) to control movement of the sheet 202 of material in a build process.

The conveyer 200 may include a scraper 216 to physically separate a completed object from the conveyer 200 based upon a relative movement of the sheet 202 of material of the conveyor 200 to the scraper 216. In general, adhesion of an object to a working surface maintains the object within the coordinate system of the printer during a build in order to facilitate the build process. Where good adhesion is achieved during a build, dislodging the completed object from the working surface may require significant force. Thus in order to ensure the availability of a continuous working surface, the conveyer 200 may enforce physical separation of the object from the working surface by passing the sheet 202 of material by the scraper 216 to dislodge the object. While the scraper 216 is depicted below the working surface of the sheet 202, it will be readily understood that a variety of positions and orientations of the scraper 216 may achieve similar results. Thus for example, the scraper 216 may extend vertically above or below the sheet 202, horizontally from the sheet 202, or in any other suitable orientation. It will also be appreciated that while the scraper 216 is depicted in an orientation perpendicular to the path 206, the scraper 216 may be angled in order to also urge a completed object off the sheet 202 in any desired direction, such as to a side of the working surface where a chute or receptacle may be provided to catch and store the completed object. In some embodiments, the conveyer 200 may transport the object to a side of the printer 100, or alternatively the entire conveyer 200 assembly may be moved outside the printer, so that urging the completed object off the sheet 202 also causes the competed object to depart the printer 100. The term 'scraper' should be understood as referring in a non-limiting sense to any physical fixture that might be employed to remove an object from the sheet 202, and that many other shapes, sizes, orientations, and the like may also or instead be employed as the scraper 216 described herein without departing from the scope of this disclosure.

In one aspect, the conveyer 200 may support networked use of the printer 100 by permitting fabrication of multiple, consecutive parts under control by a remote computer without user intervention.

Figure 3:
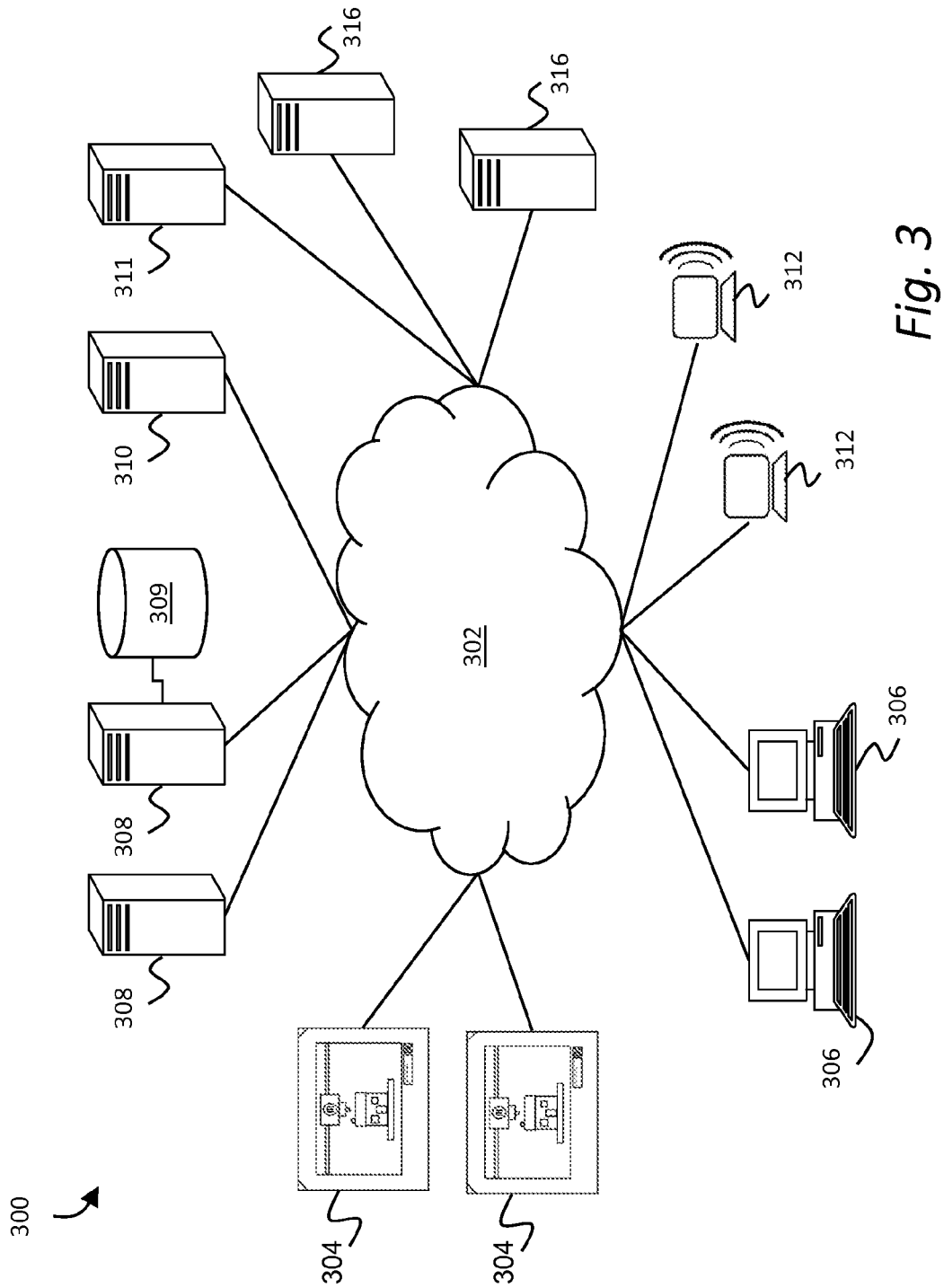
FIG. 3 depicts a networked three-dimensional printing environment.

FIG. 3 depicts a networked three-dimensional printing environment. In general, the environment 300 may include a data network 302 interconnecting a plurality of participating devices in a communicating relationship. The participating devices may, for example, include any number of three-dimensional printers 304 (also referred to interchangeably herein as "printers"), client devices 306, print servers 308, content sources 310, mobile devices 314, and other resources 316.

The data network 302 may be any network(s) or internetwork(s) suitable for communicating data and control information among participants in the environment 300. This may include public networks such as the Internet, private networks, telecommunications networks such as the Public Switched Telephone Network or cellular networks using third generation (e.g., 3G or IMT-2000), fourth generation (e.g., LTE (E-UTRA) or WiMax-Advanced (IEEE 802.16m), as well as any of a variety of corporate area or local area networks and other switches, routers, hubs, gateways, and the like that might be used to carry data among participants in the environment 300.

The three-dimensional printers 304 may be any computer-controlled devices for three-dimensional fabrication, including without limitation any of the three-dimensional printers or other fabrication or prototyping devices described above. In general, each such device may include a network interface comprising, e.g., a network interface card, which term is used broadly herein to include any hardware (along with software, firmware, or the like to control operation of same) suitable for establishing and maintaining wired and/or wireless communications. The network interface card may include without limitation wired Ethernet network interface cards ("NICs"), wireless 802.11 networking cards, wireless 802.11 USB devices, or other hardware for wireless local area networking The network interface may also or instead include cellular network hardware, wide area wireless network hardware or any other hardware for centralized, ad hoc, peer-to-peer, or other radio communications that might be used to carry data. In another aspect, the network interface may include a serial or USB port used to directly connect to a computing device such as a desktop computer that, in turn, provides more general network connectivity to the data network 302.

Client devices 306 may in general be devices within the environment 300 operated by users to initiate and monitor print jobs at the three-dimensional printers 304. This may include desktop computers, laptop computers, network computers, tablets, or any other computing device that can participate in the environment 300 as contemplated herein. Each client device 306 generally provides a user interface, which may include a graphical user interface and/or text or command line interface to control operation of remote three-dimensional printers 304. The user interface may be maintained by a locally executing application on one of the client devices 306 that receives data and status information from, e.g., the printers 304 and print servers 308 concerning pending or executing print jobs, and creates a suitable display on the client device 306 for user interaction. In other embodiments, the user interface may be remotely served and presented on one of the client devices 306, such as where a print server 308 or one of the three-dimensional printers 304 includes a web server that provides information through one or more web pages or the like that can be displayed within a web browser or similar client executing on one of the client devices 306.

The print servers 308 may include data storage, a network interface, and a processor or other processing circuitry. In the following description, where the functions or configuration of a print server 308 are described, this is intended to included corresponding functions or configuration (e.g., by programming) of a processor of the print server 308. In general, the print servers 308 (or processors thereof) may perform a variety of processing tasks related to management of networked printing. For example, the print servers 308 may manage print jobs received from one or more of the client devices 306, and provide related supporting functions such as content search and management. A print server 308 may also include a web server that provides web-based access by the client devices 306 to the capabilities of the print server 308. A print server 308 may also communicate periodically with three-dimensional printers 304 in order to obtain status information concerning, e.g., availability of printers and/or the status of particular print jobs, any of which may be subsequently presented to a user through the web server. A print server 308 may also maintain a list of available three-dimensional printers 304, and may automatically select one of the three-dimensional printers 304 for a user-submitted print job, or may permit a user to specify a single printer, or a group of preferred printers, for fabricating an object. Where the print server 308 selects the printer automatically, any number of criteria may be used such as geographical proximity, printing capabilities, current print queue, fees (if any) for use of a particular three-dimensional printer 304, and so forth. Where the user specifies criteria, this may similarly include any relevant aspects of three-dimensional printers 304, and may permit use of absolute criteria (e.g., filters) or preferences, which may be weighted preferences or unweighted preferences, any of which may be used by a print server 308 to allocate a print job to a suitable resource.

Other user preferences may be usefully stored at the print server 308 to facilitate autonomous, unsupervised fabrication of content from content sources 310. For example, a print server 308 may store a user's preference on handling objects greater than a build volume of a printer. These preferences may control whether to resize the object, whether to break the object into multiple sub-objects for fabrication, and whether to transmit multiple sub-objects to a single printer or multiple printers. In addition, user preferences or requirements may be stored, such as multi-color printing capability, build material options and capabilities, and so forth. More generally, the print queue may be managed by a print server 308 according to one or more criteria from a remote user requesting a print job. The print server 308 may also store user preferences or criteria for filtering content, e.g., for automatic printing or other handling. While this is described below as a feature for autonomous operation of a printer (such as a printer that locally subscribes to a syndicated model source), any criteria that can be used to identify models of potential interest by explicit type (e.g., labeled in model metadata), implicit type (e.g., determined based on analysis of the model), source, and so forth, may be provided to the print server 308 and used to automatically direct new content to one or more user-specified ones of the three-dimensional printers 304.

In one aspect, the processor of the print server may be configured to store a plurality of print jobs submitted to the web server in a log and to provide an analysis of print activity based on the log. This may include any type of analysis that might be useful to participants in the environment 300. For example, the analysis may include tracking of the popularity of particular objects, or of particular content sources. The analysis may include tracking of which three-dimensional printers 304 are most popular or least popular, or related statistics such as the average backlog of pending print jobs at a number of the three-dimensional printers 304. More generally, any statistics or data may be obtained, and any analysis may be performed, that might be useful to users (e.g., when requesting prints), content sources (e.g., when choosing new printable objects for publication), providers of fabrication resources (e.g., when setting fees), or network facilitators such as the print servers 308.

A print server 308 may also maintain a database 309 of content, along with an interface for users at client devices 306 to search the database 309 and request fabrication of objects in the database 309 using any of the three-dimensional printers 304. Thus in one aspect, a print server 308 (or any system including the print server 308) may include a database 309 of three-dimensional models, and the print server 308 may act as a server that provides a search engine for locating a particular three-dimensional model in the database 309. The search engine may be a text-based search engine using keyword text queries, plain language queries, and so forth. The search engine may also or instead include an image-based search engine configured to identify three-dimensional models similar to a two-dimensional or three-dimensional image provide by a user.

In another aspect, the printer server 308 may periodically search for suitable content at remote locations on the data network, which content may be retrieved to the database 309, or have its remote location (e.g., a URL or other network location identifier) stored in the database 309. In another aspect, the print server 308 may provide an interface for submission of objects from remote users, along with any suitable metadata such as a title, tags, creator information, descriptive narrative, pictures, recommended printer settings, and so forth. In one aspect, the database 309 may be manually curated according to any desired standards. In another aspect, printable objects in the database 309 may be manually or automatically annotated according to content type, popularity, editorial commentary, and so forth.

The print server 308 may more generally provide a variety of management functions. For example, the print server 304 may store a predetermined alternative three-dimensional printer to execute a print job from a remote user in the event of a failure by the one of the plurality of three-dimensional printers 304. In another aspect, the print server 308 may maintain exclusive control over at least one of the plurality of three-dimensional printers 304, such that other users and/or print servers cannot control the printer. In another aspect, the print server 308 may submit a print job to a first available one of the plurality of three-dimensional printers 304.

In another aspect, a print server 308 may provide an interface for managing subscriptions to sources of content. This may include tools for searching existing subscriptions, locating or specifying new sources, subscribing to sources of content, and so forth. In one aspect, a print server 308 may manage subscriptions and automatically direct new content from these subscriptions to a three-dimensional printer 304 according to any user-specified criteria. Thus while it is contemplated that a three-dimensional printer 304 may autonomously subscribe to sources of content through a network interface and receive new content directly from such sources, it is also contemplated that this feature may be maintained through a remote resource such as a print server 308.

A print server 308 may maintain print queues for participating three-dimensional printers 304. This approach may advantageously alleviate backlogs at individual printers 304, which may have limited memory capacity for pending print jobs. More generally, a print server 308 may, by communicating with multiple three-dimensional printers 304, obtain a view of utilization of multiple networked resources that permits a more efficient allocation of print jobs than would be possible through simple point-to-point communications among users and printers. Print queues may also be published by a print server 308 so that users can view pending queues for a variety of different three-dimensional printers 304 prior to selecting a resource for a print job. In one aspect, the print queue may be published as a number of print jobs and size of print jobs so that a requester can evaluate likely delays. In another aspect, the print queue may be published as an estimated time until a newly submitted print job can be initiated.

In one aspect, the print queue of one of the print servers 308 may include one or more print jobs for one of the plurality of three-dimensional printers 304. The print queue may be stored locally at the one of the plurality of three-dimensional printers. In another aspect, the print queue may be allocated between the database 309 and a local memory of the three-dimensional printer 304. In another aspect, the print queue may be stored, for example, in the database 309 of the print server 308. As used here, the term 'print queue' is intended to include print data (e.g., the three-dimensional model or tool instructions to fabricate an object) for a number of print job (which may be arranged for presentation in order of expected execution), as well as any metadata concerning print jobs. Thus, a portion of the print queue such as the metadata (e.g., size, status, time to completion) may be usefully communicated to a print server 308 for sharing among users while another portion of the print queue such as the model data may be stored at a printer in preparation for execution of a print job.

Print queues may implement various user preferences on prioritization. For example, for a commercial enterprise, longer print jobs may be deferred for after normal hours of operation (e.g., after 5:00 p.m.), while shorter print jobs may be executed first if they can be completed before the end of a business day. In this manner, objects can be identified and fabricated from within the print queue in a manner that permits as many objects as possible to be fabricated before a predetermined closing time. Similarly, commercial providers of fabrication services may charge explicitly for prioritized fabrication, and implement this prioritization by prioritizing print queues in a corresponding fashion.

In another aspect, a print server 308 may provide a virtual workspace for a user. In this virtual workspace, a user may search local or remote databases of printable objects, save objects of interest (or links thereto), manage pending prints, specify preferences for receiving status updates (e.g., by electronic mail or SMS text), manage subscriptions to content, search for new subscription sources, and so forth. In one aspect, the virtual workspace may be, or may include, web-based design tools or a web-based design interface that permits a user to create and modify models. In one aspect, the virtual workspace may be deployed on the web, while permitting direct fabrication of a model developed within that environment on a user-specified one of the three-dimensional printers 304, thus enabling a web-based design environment that is directly coupled to one or more fabrication resources.

The content sources 310 may include any sources of content for fabrication with a three-dimensional printer 304. This may, for example, include databases of objects accessible through a web interface or application programming interface. This may also or instead include individual desktop computers or the like configured as a server for hosted access, or configured to operate as a peer in a peer-to-peer network. This may also or instead include content subscription services, which may be made available in an unrestricted fashion, or may be made available on a paid subscription basis, or on an authenticated basis based upon some other relationship (e.g., purchase of a related product or a ticket to an event). It will be readily appreciated that any number of content providers may serve as content sources 310 as contemplated herein. By way of non-limiting example, the content sources 310 may include destinations such as amusement parks, museums, theaters, performance venues, or the like, any of which may provide content related to users who purchase tickets. The content sources 310 may include manufacturers such as automobile, computer, consumer electronics, or home appliance manufacturers, any of which may provide content related to upgrades, maintenance, repair, or other support of existing products that have been purchased. The content sources 310 may include artists or other creative enterprises that sell various works of interest. The content sources 310 may include engineering or architectural firms that provide marketing or advertising pieces to existing or prospective customers. The content sources 310 may include marketing or advertising firms that provide promotional items for clients. More generally, the content sources 310 may be any individual or enterprise that provides single or serial objects for fabrication by the three-dimensional printers 304 described herein.

One or more web servers 311 may provide web-based access to and from any of the other participants in the environment 300. While depicted as a separate network entity, it will be readily appreciated that a web server 311 may be logically or physically associated with one of the other devices described herein, and may, for example, provide a user interface for web access to one of the three-dimensional printers 304, one of the print servers 308 (or databases 309 coupled thereto), one of the content sources 310, or any of the other resources 316 described below in a manner that permits user interaction through the data network 302, e.g., from a client device 306 or mobile device 312.

The mobile devices 312 may be any form of mobile device, such as any wireless, battery-powered device, that might be used to interact with the networked printing environment 300. The mobile devices 312 may, for example, include laptop computers, tablets, thin client network computers, portable digital assistants, messaging devices, cellular phones, smart phones, portable media or entertainment devices, and so forth. In general, mobile devices 312 may be operated by users for a variety of user-oriented functions such as to locate printable objects, to submit objects for printing, to monitor a personally owned printer, and/or to monitor a pending print job. A mobile device 312 may include location awareness technology such as Global Positioning System ("GPS"), which may obtain information that can be usefully integrated into a printing operation in a variety of ways. For example, a user may select an object for printing and submit a model of the object to a print server, such as any of the print servers described above. The print server may determine a location of the mobile device 312 initiating the print job and locate a closest printer for fabrication of the object.

In another aspect, a printing function may be location-based, using the GPS input (or cellular network triangulation, proximity detection, or any other suitable location detection techniques). For example, a user may be authorized to print a model only when the user is near a location (e.g., within a geo-fenced area or otherwise proximal to a location), or only after a user has visited a location. Thus a user may be provided with printable content based upon locations that the user has visited, or while within a certain venue such as an amusement park, museum, theater, sports arena, hotel, or the like.

The other resources 316 may include any other software or hardware resources that may be usefully employed in networked printing applications as contemplated herein. For example, the other resources 316 may include payment processing servers or platforms used to authorize payment for content subscriptions, content purchases, or printing resources. As another example, the other resources 316 may include social networking platforms that may be used, e.g., to share three-dimensional models and/or fabrication results according to a user's social graph. In another aspect, the other resources 316 may include certificate servers or other security resources for third party verification of identity, encryption or decryption of three-dimensional models, and so forth. In another aspect, the other resources 316 may include online tools for three-dimensional design or modeling, as well as databases of objects, surface textures, build supplies, and so forth. In another aspect, the other resources 316 may include a desktop computer or the like co-located (e.g., on the same local area network with, or directly coupled to through a serial or USB cable) with one of the three-dimensional printers 304. In this case, the other resource 316 may provide supplemental functions for the three-dimensional printer 304 in a networked printing context such as maintaining a print queue or operating a web server for remote interaction with the three-dimensional printer 304. More generally, any resource that might be usefully integrated into a networked printing environment may be one of the resources 316 as contemplated herein.

It will be readily appreciated that the various components of the networked printing environment 300 described above may be arranged and configured to support networked printing in a variety of ways. For example, in one aspect there is disclosed herein a networked computer with a print server and a web interface to support networked three-dimensional printing. This device may include a print server, a database, and a web server as discussed above. The print server may be coupled through a data network to a plurality of three-dimensional printers and configured to receive status information from one or more sensors for each one of the plurality of three-dimensional printers. The print server may be further configured to manage a print queue for each one of the plurality of three-dimensional printers. The database may be coupled in a communicating relationship with the print server and configured to store print queue data and status information for each one of the plurality of three-dimensional printers. The web server may be configured to provide a user interface over the data network to a remote user, the user interface adapted to present the status information and the print queue data for one or more of the plurality of three-dimensional printers to the user and the user interface adapted to receive a print job from the remote user for one of the plurality of three-dimensional printers.

The three-dimensional printer 304 described above may be configured to autonomously subscribe to syndicated content sources and periodically receive and print objects from those sources. Thus in one aspect there is disclosed herein a device including any of the three-dimensional printers described above; a network interface; and a processor (which may without limitation include the controller for the printer). The processor may be configured to subscribe to a plurality of sources of content (such as the content sources 310 described above) selected by a user for fabrication by the three-dimensional printer through the network interface. The processor may be further configured to receive one or more three-dimensional models from the plurality of content sources 310, and to select one of the one or more three-dimensional models for fabrication by the three-dimensional printer 304 according to a user preference for prioritization. The user preference may, for example, preferentially prioritize particular content sources 310, or particular types of content (e.g., tools, games, artwork, upgrade parts, or content related to a particular interest of the user).

The memory of a three-dimensional printer 304 may be configured to store a queue of one or more additional three-dimensional models not selected for immediate fabrication. The processor may be programmed to periodically re-order or otherwise alter the queue according to pre-determined criteria or manual user input. For example, the processor may be configured to evaluate a new three-dimensional model based upon a user preference for prioritization, and to place the new three-dimensional model at a corresponding position in the queue. The processor may also or instead be configured to retrieve content from one of the content sources 310 by providing authorization credentials for the user, which may be stored at the three-dimensional printer or otherwise accessible for presentation to the content source 310. The processor may be configured to retrieve content from at least one of the plurality of content sources 310 by authorizing a payment from the user to a content provider. The processor may be configured to search a second group of sources of content (such as any of the content sources 310 described above) according to one or more search criteria provide by a user. This may also or instead include demographic information for the user, contextual information for the user, or any other implicit or explicit user information.

In another aspect, there is disclosed herein a system for managing subscriptions to three-dimensional content sources such as any of the content sources 310 described above. The system may include a web server configured to provide a user interface over a data network, which user interface is adapted to receive user preferences from a user including a subscription to a plurality of sources of a plurality of three-dimensional models, a prioritization of content from the plurality of sources, and an identification of one or more fabrication resources coupled to the data network and suitable for fabricating objects from the plurality of three-dimensional models. The system may also include a database to store the user preferences, and to receive and store the plurality of three-dimensional models as they are issued by the plurality of sources. The system may include a processor (e.g., of a print server 308, or alternatively of a client device 306 interacting with the print server 308) configured select a selected one of the plurality of three-dimensional models for fabrication based upon the prioritization. The system may include a print server configured to communicate with the one or more fabrication resources through the data network, to determine an availability of the one or more fabrication resources, and to transmit the selected one of the plurality of three-dimensional models to one of the one or more fabrication resources.

In another aspect, there is disclosed herein a network of three-dimensional printing resources comprising: a plurality of three-dimensional printers, each one of the plurality of three-dimensional printers including a network interface; a server configured to manage execution of a plurality of print jobs by the plurality of three-dimensional printers; and a data network that couples the server and the plurality of three-dimensional printers in a communicating relationship.

In general as described above, the server may include a web-based user interface configured for a user to submit a new print job to the server and to monitor progress of the new print job. The web-based user interface may permit video monitoring of each one of the plurality of three-dimensional printers, or otherwise provide information useful to a remote user including image-based, simulation-based, textual-based or other information concerning status of a current print. Details of a suitable user interface are discussed in further detail with reference to FIG. 5.

The fabrication resources may, for example, include any of the three-dimensional printers 304 described above. One or more of the fabrication resources may be a private fabrication resource secured with a credential-based access system. The user may provide, as a user preference and prior to use of the private fabrication resource, credentials for accessing the private fabrication resource. In another aspect, the one or more fabrication resources may include a commercial fabrication resource. In this case the user may provide an authorization to pay for use of the commercial fabrication resource in the form of a user preference prior to use of the commercial fabrication resource.

Many current three-dimensional printers require significant manufacturing time to fabricate an object. At the same time, certain printers may include a tool or system to enable multiple, sequential object prints without human supervision or intervention, such as the conveyor belt described above. In this context, prioritizing content may be particularly important to prevent crowding out of limited fabrication resources with low priority content that arrives periodically for autonomous fabrication. As a significant advantage, the systems and methods described herein permit prioritization using a variety of user-specified criteria, and permit use of multiple fabrication resources in appropriate circumstances. Thus prioritizing content as contemplated herein may include any useful form of prioritization. For example, this may include prioritizing the content according to source. The content sources 310 may have an explicit type that specifies the nature of the source (e.g., commercial or paid content, promotional content, product support content, non-commercial) or the type of content provided (e.g., automotive, consumer electronics, radio control hobbyist, contest prizes, and so forth). Prioritizing content may include prioritizing the content according to this type. The three-dimensional models themselves may also or instead include a type (e.g., tool, game, home, art, jewelry, replacement part, upgrade part, etc.), and prioritizing the content may includes prioritizing the content according to this type.

In one aspect, the processor may be configured to select two or more of the plurality of three-dimensional models for concurrent fabrication by two or more of the plurality of fabrication resources based upon the prioritization when a priority of the two or more of the plurality of three-dimensional models exceeds a predetermined threshold. That is, where particular models individually have a priority above the predetermined threshold, multiple fabrication resources may be located and employed to fabricate these models concurrently. The predetermined threshold may be evaluated for each model individually, or for all of the models collectively such as on an aggregate or average basis.

In one aspect, the processor may be configured to adjust prioritization based upon a history of fabrication when a number of objects fabricated from one of the plurality of sources exceeds a predetermined threshold. Thus, for example, a user may limit the number of objects fabricated from a particular source, giving subsequent priority to content from other sources regardless of an objectively determined priority for a new object from the particular source. This prevents a single source from overwhelming a single fabrication resource, such as a personal three-dimensional printer operated by the user, in a manner that crowds out other content from other sources of possible interest. At the same time, this may enable content sources 310 to publish on any convenient schedule, without regard to whether and how subscribers will be able to fabricate objects.

In another aspect, the processor may be configured to identify one or more additional sources of content based upon a similarity to one of the plurality of sources of content. For example, where a content source 310 is an automotive manufacturer, the processor may perform a search for other automotive manufactures, related parts suppliers, mechanics, and so forth. The processor may also or instead be configured to identify one or more additional sources of content based upon a social graph of the user. This may, for example, include analyzing a social graph of relationships from the user to identify groups with common interests, shared professions, a shared history of schools or places of employment, or a common current or previous residence location, any of which may be used to locate other sources of content that may be of interest to the user.

Figure 4:
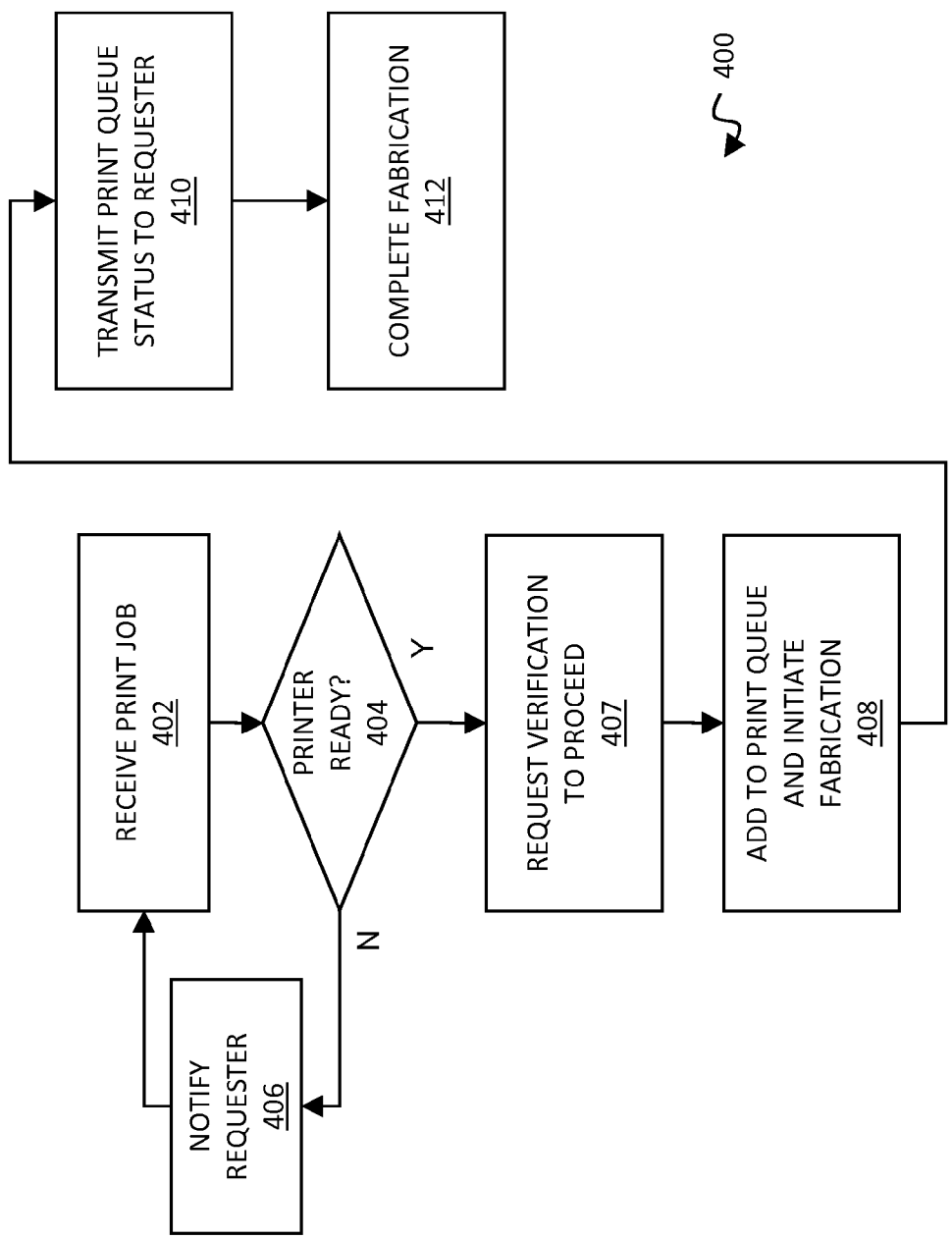
FIG. 4 is a flowchart of a method for using a three-dimensional printer, such as any of the three-dimensional printers described above, when coupled to a data network.

FIG. 4 depicts a method for operating a three-dimensional printer, such as any of the three-dimensional printers described above, when coupled to a data network. As contemplated above, the three-dimensional printer may include a network interface for coupling to the data network, as well as any number of sensors that provide status information for various aspects of the three-dimensional printer, which status information may be communicated over the data network to a remote user or other automated or manual resource in order to monitor submission, progress, and completion of a print job. In general, the printer may operate as an autonomous network device coupled directly to the Internet through a cable mode, router, hub, or the like. In another aspect, the printer may use a computer or other computing resource coupled to the printer through a local area network or the like for steps requiring intensive computation (e.g., converting from a stereolithography or other computer automated design format into tool instructions), substantial storage (e.g., print queue management), or other hardware (e.g., cameras, environmental sensors, and so forth).

As shown in step 402, the method 400 may begin with receiving a print job over the data network, which may include any of the data networks described above. The print job may be received from a requester, which may for example include a remote device (or user of the remote device) such as a laptop or other computer. The requester may be coupled in a communicating relationship to the three-dimensional printer through the data network in a host-client relationship, a peer-to-peer relationship, a mutually hosted relationship (e.g., with both devices hosted by a third networked device) or any other relationship capable of supporting communications and data transfer between the requester and the three-dimensional printer. In another aspect, a user may communicate indirectly with the three-dimensional printer, such as by interacting over the data network with a print server, subscription content source, or any other resource or service that facilitates managed access to the three-dimensional printer over the data network, and acts as the requester to submit the print job.

As shown in step 404, the method 400 may include evaluating an availability of the three-dimensional printer for the print job. This may be based upon a signal from any of the sensors associated with the three-dimensional printer. It will be understood that this evaluation may be performed locally at the three-dimensional printer, with an availability indicator transmitted back to the requester, or this evaluation may be performed remotely by a device that receives sensor data in raw or processed form from the sensor(s) of the three-dimensional printer.

A wide variety of evaluations may be performed. For example, the evaluation may relate to the status of a current job executing on the three-dimensional printer, or an analysis of one or more other jobs in a local queue of the three-dimensional printer, any of which might result in the three-dimensional printer being unavailable. For example, where the printer has a substantial number of queued jobs that will require several hours to fabricate, or that uses all available local memory of the printer, then the printer may be identified as unavailable for additional print jobs. As another example, the evaluation may be based upon other sensors such as thermostats, motion or position error detectors, or optical sensors, any of which might permit inferences concerning the ability of the three-dimensional printer to execute a print job. For example, if an optical sensor detects an object within a working volume of the three-dimensional printer, or if a thermal sensor detects that a print head is not at a suitable temperature (or is not responding correctly to a heating command), the printer may not be ready and a corresponding evaluation may be provided. As another example, a sensor may detect a quantity of build material available to the printer, and a processor on the printer may determine if the supply is inadequate for the requested print job. Thus evaluating the availability of the three-dimensional printer may include accepting the print job only if a supply of build material available for the three-dimensional printer exceeds an amount of build material required for the print job and one or more additional jobs ahead of the requested print job in the queue.

Similarly, any of a variety of status checks for normal, error-free functioning of the three-dimensional printer may be undertaken prior to accepting (or transmitting from a requester) a new print job. More generally, a variety of sensors and other inputs (including, e.g., data that may be stored locally in a memory of the three-dimensional printer) may provide useful information for assessing the availability of the device, and may be used as the sensor(s) contemplated herein to evaluate availability of the three-dimensional printer for a print job.

In one aspect, the evaluation may be based on a receiving state of the three-dimensional printer. The receiving state may be inferred based on various sensor signals and/or data indicative of whether the three-dimensional printer is currently engaged in a print. In another aspect, the receiving state may be explicitly provided by an owner or administrator of the three-dimensional printer, thus providing an opportunity for the administrator to control what level of access to the printing resource will be provided to external users who might connect to the printer over the data network. Thus the receiving state may be selected from a group including, e.g., open, closed, or authenticated. In general, the open receiving state may permit access to any remote user, while the closed receiving state does not permit access to any remote users (such as where the owner wishes to connect to the data network to retrieve remote content, but does not wish to make the three-dimensional printer publicly available). The authenticated receiving state may permit remote access conditioned upon receipt of appropriate credentials. Thus in one aspect, availability may be based upon an identity of a user—the requester—associated with the print job. In this case, evaluating availability of the three-dimensional printer may include assessing an identity of the user, which may be determined, e.g., using access credentials such as a user name and password, a digital certificate, or any other techniques for securely identifying the user, either locally or with reference to a trusted external resource such as a certificate server or the like.

In another aspect, the print job itself may be secured for communication to the three-dimensional printer using, e.g., encryption of print or model data. The printer may in turn conditionally authorize printing according to any related access credentials. Thus in one aspect the method may include securing the print job using a digital rights management technique that restricts execution of the print job to one or more predetermined three-dimensional printers or to a printer having suitable credentials. In this context, evaluating the availability of the three-dimensional printer may include determining whether the three-dimensional printer is one of the one or more predetermined three-dimensional printers, or whether the three-dimensional printer has appropriate credentials. This technique may be particularly useful, for example, where the print job includes purchased content or the like for which the content creator (or distributor) wishes to retain control of fabrication, e.g., by limiting who, where, when, or how many times the print job can be fabricated.

The evaluation may also or instead be based on a variety of sensor measurements and/or other data or information about the processing status of the three-dimensional printer. By way of example and not of limitation, evaluating the availability of the three-dimensional printer may include determining a percentage completion of a current print job at the three-dimensional printer. Evaluating the availability of the three-dimensional printer may include estimating a wait time until the three-dimensional printer will be available and transmitting the wait time to the requester. Evaluating the availability of the three-dimensional printer may include determining whether the three-dimensional printer is immediately available.

It will also be appreciated that a wide variety of sensors may usefully be employed in this evaluation. By way of non-limiting example, the plurality of sensors may include a video camera directed toward a working volume of the three-dimensional printer. The plurality of sensors may include an optical sensor that detects obstructions within a working volume of the three-dimensional printer. The plurality of sensors may include a sensor that detects a quantity of build material available. The plurality of sensors may include a sensor that detects a presence of build material in a material supply feed.

As shown in step 406, when the three-dimensional printer is not available for a print job, the method 400 may include electronically notifying the requester that the print job has been rejected. This may, for example, include a notification such as a textual message or graphic displayed within a user interface used by the requester to submit the print job, or this may include a notification using any suitable communication medium such as an SMS text message or electronic mail communication to the requester.

When the three-dimensional printer is not available for the print job, additional processing may be performed prior to notifying the requester, such as a search for additional, suitable printing resources and/or redirection of the print job. Thus in one aspect, the method may include identifying one or more alternative three-dimensional printers coupled to the data network as resources available for the print job when the three-dimensional printer is not available. In another aspect, when the three-dimensional printer is not available, the method may include identifying an alternative three-dimensional printer coupled to the data network and redirecting the requester to the alternative three-dimensional printer. The redirecting may include automatically redirecting the print job without user intervention, or the redirecting may include transmitting a suggestion to the requester to use the alternative three-dimensional printer. More generally, any suitable information about other available resources and/or redirection of the request may be transmitted to the requester when the three-dimensional printer that received the print job is determined to be unavailable. This may also include information about an expected wait time until the printer will be available, when such information is provided by the printer or can be reasonably inferred from other information.

As shown in step 407, a manual verification may be optionally requested, even where the three-dimensional printer is otherwise determined to be available, before adding the print job to the print queue. The request for manual verification by the requester may be provided, for example, along with contextual information such as an expected time before the print job can begin fabrication, or a current image of the three-dimensional printer (e.g., of the working volume or supply of build material). Thus in one aspect, evaluating the availability of the three-dimensional printer may include transmitting an image of the three-dimensional printer to the requester, and receiving a manual confirmation to proceed with the print job from the requester.

As shown in step 408, when the three-dimensional printer is available, the method 400 may include adding the print job to a queue for the three-dimensional printer and initiating fabrication of an object according to the queue. It will be understood that the three-dimensional printer may only have storage for a current print job, in which case the print queue, or more specifically, the local print queue, may consist of a currently active print job containing zero or one print jobs at all times. In another aspect, the three-dimensional printer may have adequate storage and processing capabilities to locally manage a substantial queue of print jobs, or alternatively, may be coupled to a local resource such as a co-located desktop or laptop computer or networked-attached storage that can operate as a local print queue resource for the three-dimensional printer. When the print job is accepted, a notification may be sent to the requester using, e.g., any of the notification techniques described above.

It will be appreciated that certain print jobs may include multiple, separate physical objects. These objects may be generally unrelated, e.g., where a requester simply decides to build multiple objects at one time, or these objects may be related. Related objects may include structurally related objects, such as where an object larger than a build volume is constructed from several smaller pieces, where the object has several independent moving parts. Related objects may also or instead be contextually related, as with a collection of game pieces such as pieces for a chess board. When a request includes multiple objects, adding these objects to the print queue may include additional processing to allocate the objects among a number of suitable fabrication resources. Thus in one aspect where the print job includes a plurality of objects, the method may include identifying a plurality of printers in proximity to the three-dimensional printer and allocating the plurality of objects for concurrent fabrication among the plurality of printers. This allocation may be managed by the three-dimensional printer that received the request (e.g., by having the printer act as a requester for several other proximate resources), or this allocation may be managed by a remote print server that identifies and coordinates operation of a number of physically proximate or otherwise suitable resources.

As shown in step 410, the method 400 may include providing information about a queue for the three-dimensional printer to the requester. This may include transmitting a print queue status to the requester for display in a user interface or within the body of an electronic mail message or text message, or more generally using any suitable communication medium. Although depicted in FIG. 4 as occurring after a print job is added to the print queue, it will be understood that the print queue status may be usefully shared with the requester at any time before or during processing of the print job, and/or periodically while the print job is pending or executing.

As shown in step 412, the method 400 may include completing fabrication, after which the requester may be notified and the object retrieved using any suitable online and/or offline techniques.

Print queue status information as contemplated above may also include information relating to operation of the three-dimensional printer. For example, the method may include transmitting status information from one or more of the plurality of sensors to the requester during an execution of the print job. The method may include notifying the requester of a successful completion of the print job, or the method may include notifying the requester if the print job fails to complete. In this communication of status information, the three-dimensional printer may also request further user input, such as by inquiring whether to try printing the object again, or whether to forward an unsuccessful print job to another resource. In one aspect, the status information may include at least one photograph captured, e.g., from a video camera or digital still camera associated with the printer, which may be transmitted directly to the requester, or to some other location such as a social networking platform. In one aspect, the social networking platform may include one or more of Flickr, Twitter, LinkedIn, Google+, and Facebook, or any other website or the like where the requester can share the at least one photograph with others using tools available within the social networking platform.

It will be readily appreciated that the above steps are provided by way of example and not limitation, and that numerous variations are possible including additions, omissions, and or variations of the steps recited above. All such variations as would be appreciated by one of ordinary skill in the art are intended to fall within the scope of this disclosure. In particular, the various step described above may be performed by a networked printer that directly hosts a connection with a remote user, or by a print server or the like that mediates print job administration between users and fabrication resources. Thus the various steps may be performed in a distributed manner among two or more of a user, by a print server, and/or by a three-dimensional printer depending upon the specific network of devices performing the method. By way of example, a three-dimensional model may be transmitted directly from a three-dimensional scanner to a three-dimensional printer for fabrication. The scanner and the printer may be locally coupled to one another, or remotely coupled through a print server or the like, or connected through a network using a peer-to-peer or similar relationship.

It will also be understood that this disclosure includes apparatus for performing the methods described above. Thus in one aspect there is disclosed a three-dimensional printer including a network interface configured to receive a print job from a requester over a data network, a plurality of sensors that provide status information for a plurality of aspects of the three-dimensional printer; and a processor configured to evaluate an availability of the three-dimensional printer for the print job based upon a signal from at least one of the plurality of sensors. The processor may include any suitable processing circuitry such as any controller, microcontroller, microprocessor and/or other circuitry used to control the three-dimensional printer, and/or any similar processing circuitry in a co-located computer or the like. Where processing is distributed, e.g., among multiple printers, a print server, a requester device, and so forth, the various steps may be distributed in any suitable fashion consistent with networked printing as contemplated herein.

In another aspect, the method steps may be embodied in computer executable code stored in a non-transitory computer readable medium such as a computer memory. Thus there is disclosed herein a computer program product embodied in a non-transitory computer readable medium that, when executing on one or more computing devices, performs any of the steps described above. In one aspect, this may include the steps of: receiving a print job from a requester over a data network at a three-dimensional printer, the three-dimensional printer including a plurality of sensors that provide status information for a plurality of aspects of the three-dimensional printer; and evaluating an availability of the three-dimensional printer for the print job based upon a signal from at least one of the plurality of sensors.

Figure 5:
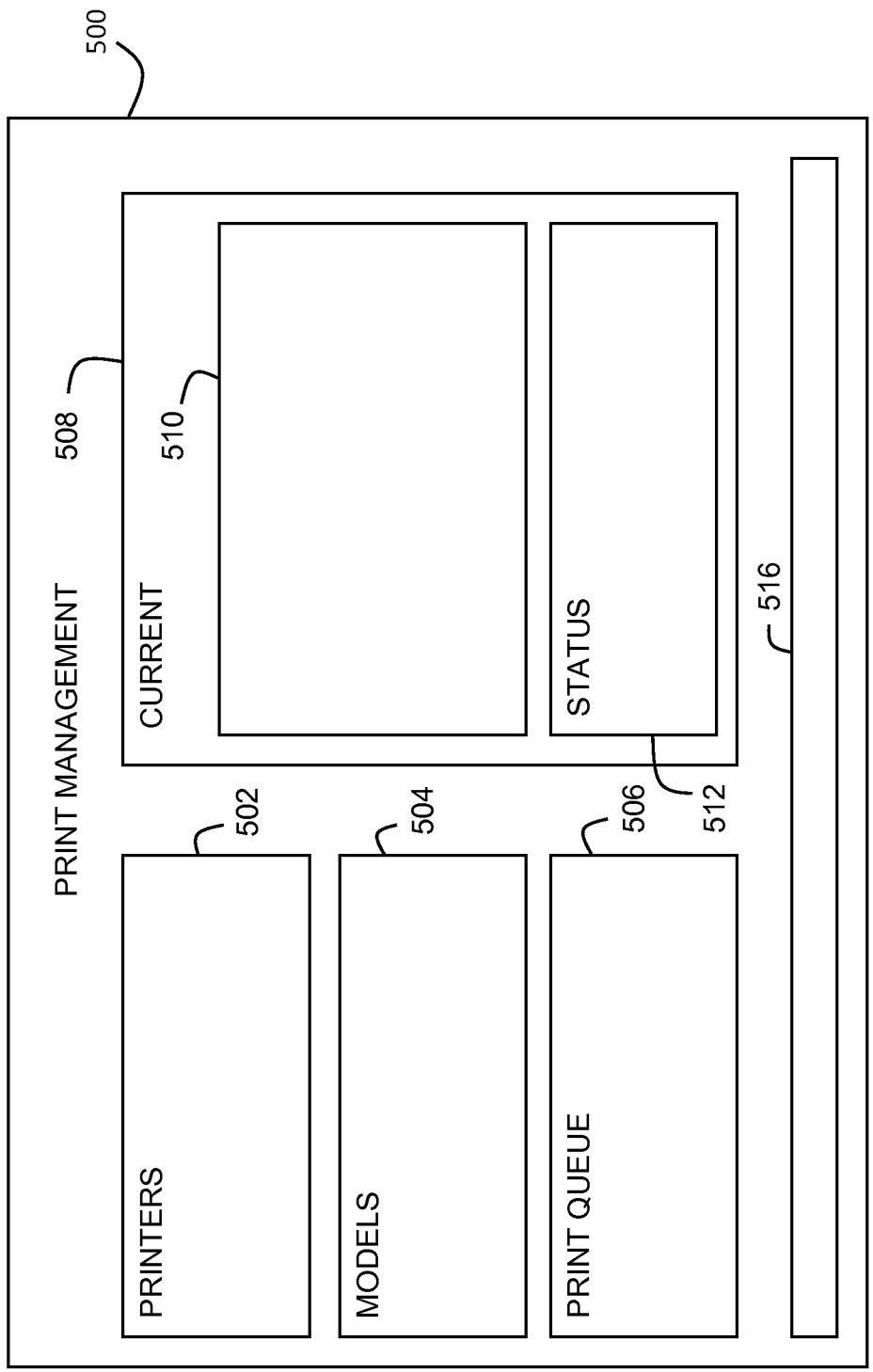
FIG. 5 depicts a user interface for management of networked printing.

FIG. 5 depicts a user interface for networked three-dimensional printing. The user interface 500 may be a web page or other remotely created and executed interface supported, e.g., by one of the print servers or web servers described above. In another embodiment, the user interface 500 may be served by one of the three-dimensional printers described above, which may execute a web server for remote access to administrative or fabrication functions of the three-dimensional printer. In another embodiment, the user interface 500 may be created by a local application that retrieves data, images, print queue information, models, and so forth from a variety of remote applications and other resources, while also formatting outbound commands from the client device to the various resources so that the remote resources can be integrated within a single workspace on a client device. The user interface 500 may in general be rendered on a display or similar hardware on a client device or mobile device, and may permit user interaction through any suitable controls to permit local control and administration of remote fabrication resources. In general, the user interface 500 may be an interface for management of a variety of remote fabrication resources as generally described above.

For example, the user interface 500 may include a first display area 502 that shows a list of available online three-dimensional printers or other fabrication resources. This display area may be interactive, and may permit, e.g., sorting of fabrication resources, searching for new fabrication resources, and the like. The first display area 502 may also or instead provide status information for each listed fabrication resource, such as information about availability, recent print activity, a current queue of objects for printing at that resource, and so forth. In one aspect where the user interface 500 is a web page for remote users to manage fabrication, the first display area 502 may be adapted to receive a manual selection of one of the plurality of three-dimensional printers from the remote user to execute a print job.

The user interface 500 may also or instead include a second display area 504 that shows a list of available models for fabrication by the fabrication resources. This may include any of a variety of interactive features such as search capabilities for models, and links to information about models such as cost, user reviews, complexity and print time, model renderings, descriptions, notes from a content provider, and so forth. This may also include an interface tool to permit a user to fabricate a model. The second display area 504 may be adapted to receive a batch print job from a remote user, the batch print job including a plurality of related print jobs. For example, a user may select an object displayed in the second display area 504 that includes multiple parts, or the user may select multiple items listed in the second display area 504 (using, e.g., a conventional control key and mouse click, or any other suitable user interface controls/techniques) for batch processing. This may also permit the remote user to provide additional, related information, such as a permissible allocation of the plurality of related print jobs among the plurality of three-dimensional printers, which permissible allocation may include general preferences (e.g., high-speed printers or local printers), specific preferences (e.g., use printer xyz), or firm requirements (e.g., use only printer xyz, or only printers selected from a specific group).

The user interface 500 may also or instead include a third display area 506 that shows a print queue. This may include a local print queue for a specific fabrication resource, or this may include a print queue stored at a print server for a user, along with information about where and when each object is scheduled for fabrication. The user interface 500 may permit one-click drag-and-drop print queue management of three-dimensional printing jobs. For example, a user may simply drag an object from the second display area 504 (objects) into the third display area 506 (print queue) where the object may be automatically or manually prioritized for execution. Alternatively, the user may drag an object from the second display area 504 into the first display area 502 (printers) to request (with a single operation) fabrication of the object by a specific printer. More generally, the user interface 500 may facilitate control over fabrication of models from a variety of content sources using a variety of fabrication resources, some or all of which may be remote from a current user manipulating the user interface 500.

The user interface 500 may include a fourth display area 508 that displays information for a currently active print job. This area may usefully include any information related to the print job such as status, time to completion, source, current time, etc. Additionally, this area may include a control or group of controls for manual operation of the three-dimensional printer by a remote user. Thus for example a user may remotely stop fabrication, restart fabrication, cancel fabrication, change fabrication settings, perform a test extrusion, and so forth, as though the user were locally controlling the printer.

The fourth display area 506 may include a visualization area 510 that displays a visual representation of the print job. For example, the visualization area 510 may display a current tool path of the printer that is executing the print job, such as a two-dimensional layer of the object showing a path of a print head as it traverses that layer. The visualization area 510 may also or instead show a simulated print object, such as a rendering of a three-dimensional model depicting a current state of the completion of an object being fabricated according to a print job. The visualization area 510 may also or instead show an image of a working volume of a three-dimensional printer or other fabrication resource captured during execution of the print job. This may, for example, include a digital still image (which may be updated periodically) or a video image captured from a video camera at the three-dimensional printer. Thus a user may visually monitor progress or status of a remote print job through the user interface 500. A status area 512 may also be provided that shows current status information (e.g., percentage completion, time until start, time until completion, and so forth) for the active resource.

The user interface 500 may also include a menu bar 516 or the like for other functions not otherwise accounted for within the other active areas. This may include file information, search tools, help menus, user or account information, and so forth. This may include controls to share information about print activity. For example, the user interface may include at least one control to capture a frame of data from the video camera as a video image and to transmit the video image to a remote location through the data network. The remote location may, for example, be a social networking site such as any of the social network platforms described above. In another aspect, the device may be configured to transmit the video image in an electronic mail communication to, e.g., the user or one or more recipients identified by the user. In another aspect, the user interface may include a control to capture a stop-motion animation of a fabrication of an object using the video camera. This may include user controls for a frame rate, duration, or other parameters of the stop-motion animation so that an animation of desired length and detail can be created for sharing or other use.

FIG. 6 is a flowchart of a method for operating a three-dimensional printer on a network. In particular, the method 600 of FIG. 6 emphasizes autonomous operation of the three-dimensional printer using content available through the data network.

The method 600 may begin with coupling a three-dimensional printer to a data network, as shown in step 602.

As shown in step 604, the method 600 may include locating one or more sources of content for fabrication by the three-dimensional printer on the data network according to one or more user-provided criteria. The sources of content may, for example, include any of the content sources described above, which may provide content on a syndicated basis using any suitable protocol (such as RSS or the like) so that the three-dimensional printer can identify new content from the content sources as the new content becomes available.

As shown in step 606, the method 600 may include subscribing to new content from the one or more sources of content.

As shown in step 608, the method may include receiving at least one three-dimensional model of new content from one of the one or more sources of content. This may occur in a variety of ways. For example, where the three-dimensional printer has subscribed to an RSS feed provided by the content source, a new item in the RSS feed (or media enclosure or similar content embedded in the feed) may provide a URL or the like that identifies a network location for a three-dimensional model, along with any metadata that the three-dimensional printer might use (or present to a user for evaluation) to determine whether to retrieve the three-dimensional model. It will be understood that while RSS ("RDF Site Summary," a.k.a., "Really Simple Syndication") provides one useful platform for syndicating content including three-dimensional models, any suitable technology or combination of technologies may also or instead be employed, including 'push' technologies that forward notifications to clients and/or 'pull' technologies that explicitly request updates on any suitable regular or ad hoc basis.

It will be understood that fabrication of a single model using certain techniques may take a substantial amount of time, regardless of the rate at which individual models or groups of models are published from different sources. As such, a method as contemplated herein may advantageously apply local prioritization to ensure that more desirable content is not crowded out of limited fabrication resources by less desirable content. Receiving content as shown in step 608 may also include receiving a plurality of three-dimensional models and prioritizing fabrication of the plurality of three-dimensional models into an order of fabrication.

As shown in step 610, the method may include fabricating an object from the at least one three-dimensional model. As noted above, this may include fabricating a plurality of three-dimensional models in an order determined by a local prioritization scheme. Additional features may be usefully provided. For example, the model may be locally analyzed by a printer and automatically scaled according to the printer's build volume, or the model may alternatively be divided into multiple, separate objects, each fitting within the build volume, and all capable of being assembled into the original object. This approach may be particularly advantageous where a printer is autonomously receiving and fabricating multiple objects in succession without user supervision.

Thus, in one aspect there is disclosed a three-dimensional printer configured for autonomous operation to retrieve and fabricate content published to a network. While the method 600 described above is generally local in nature, it will be appreciated that other collocated resources may be used, such as a desktop computer or the like coupled to a three-dimensional printer, which desktop computer may subscribe to content, prioritize new content, and then direct the content to the local three-dimensional printer. In another aspect, the various steps may be performed by a print server or the like which couples remote content sources to remote three-dimensional printers according to any user criteria. More generally, a variety of additions, omissions, rearrangements and modifications to the steps described above may be employed without departing from the scope of this disclosure.

FIG. 7 is a flowchart of a method for operating a three-dimensional printer with a video camera and a network interface. In particular, the method 700 of FIG. 7 emphasizes incorporation of data from the video camera into operation and management of the three-dimensional printer.

As shown in step 702, the method 700 may begin with providing a three-dimensional printer including a build volume, a network interface coupled to a data network, and a video camera positioned to capture video of the build volume from a point of view, such as from above or in front a side of the build volume. This may, for example, include any of the three-dimensional printers described above.

As shown in step 704, the method 700 may include receiving a three-dimensional model through the network interface using, e.g., any of the techniques for locating and retrieving models as described above. By way of example, this may include direct access to a content source, syndicated access to a feed of content, and/or use of a print server or other remote print management tool.

As shown in step 706, the method 700 may include fabricating the three-dimensional model as an object within the build volume of the three-dimensional printer, all as generally contemplated above.

As shown in step 708, the method 700 may include providing a user interface to a remote user accessing the device through the network interface, wherein the user interface presents an image of the build volume from the camera and a two-dimensional projection of the three-dimensional model from the point of view of the video camera. This may be any of the user interfaces described above, or any other suitable interface for conveying visual information such as a video image and/or model projection. It will be understood that a variety of user interface technologies and techniques are well known in the art, any of which may be suitably adapted to providing the user interface as contemplated herein. The two-dimensional projection may be any suitable rendering, simulation, or other visualization of the model and its current state of completion. Thus for example the two-dimensional projection may be obtained from a three-dimensional scanner or other data acquisition device coupled to a processor of the three-dimensional printer. The two-dimensional projection may be an image of the object as simulated based upon operation of the three-dimensional printer, using, e.g., a tool path history or a current state of completion. The two-dimensional projection may be dynamically updated to correspond to a state of physical completion of the object in order to provide real time, or quasi-real time visual status information. In one aspect, the two-dimensional projection may simply be a video image from the video camera.

As shown in step 710, the method 700 may include transmitting status information over the data network upon completion of the object. This may, for example, include data presented through the user interface, or any other status information or summary thereof. For example, the status information may include a digital image from the video camera, which may be transmitted with an electronic mail communication confirming completion of the object. More generally, status information may include any of the status information described above, and may be transmitted to a user through an electronic mail communication, instant messaging text message, or any other suitable communication medium.

It will be readily appreciated that a device such as a three-dimensional printer may be configured to perform the steps described above. Thus in one aspect there is disclosed herein a device including: a three-dimensional printer having a build volume; a network interface coupled to a data network; a video camera positioned to capture video of the build volume from a point of view; and a processor configured to receive a three-dimensional model through the network interface, and to control operation of the three-dimensional printer to fabricate the three-dimensional model as an object within the build volume of the three-dimensional printer, the processor further configured to provide a user interface to a remote user accessing the device through the network interface, and to present in the user interface an image of the build volume from the camera and a two-dimensional projection of the three-dimensional model from the point of view of the video camera.

The processor may be configured to monitor operation of the three-dimensional printer based upon a comparison of the two-dimensional projection with the image of the build volume. Using this type of image analysis, it may be possible to track actual progress against predicted progress to identify equipment malfunctions or other interference that might cause the physical object to deviate from the model used to fabricate the physical object. For example, a temperature change in an extruder, an air bubble in a path of melted supply material, or a tool misstep might cause an unrecoverable error in a fabrication process. By comparing actual to expected two-dimensional or three-dimensional results, a fabrication process can be expeditiously aborted and restarted or otherwise addressed without waiting for completion and physical inspection of the constructed object. In addition, more subtle fabrication errors such as misalignment of layers, surface holes, inaccurate material build-ups or deposits, rotational distortion, and so forth may also be detected and address prior to completion of a build. More generally, a variety of machine vision functions may be implemented locally, or with cooperation between a local printer and a remote print server, using a video camera or digital still camera as a source of visual input.

As generally described above, the three-dimensional printer may be configured with a variety of tools and functions to facilitate networked use. For example, the processor may be configured to provide credential-based access to a user interface of the three-dimensional printer. As another example, the user interface may provide status information for the three-dimensional printer. This may include status information for a build process executing on the three-dimensional printer currently, or an anticipated build. The user interface may usefully display a two-dimensional tool path for the three-dimensional printer, the two-dimensional tool path corresponding to a current layer of the object during a fabrication of the object by the three-dimensional printer, or any other useful two-dimensional information. In one aspect, the processor may be configured to couple the three-dimensional printer in a communicating relationship with a remote print server through the data network, such as to facilitate networked use or management of the three-dimensional printer through the remote print server.

The three-dimensional printer may also be configured for a variety of diagnostic and technical support functions. For example, the user interface may support remote access for technical support during local operation of the three-dimensional printer. Thus for example, technical support personnel may connect to the three-dimensional printer and employ the user interface to configure, troubleshoot, reprogram or update the three-dimensional printer from a remote location. The process may be programmed for supporting functions. For example, the processor may be configured to fabricate a test object, capture an image of the test object, and compare the image to the test object to validate operation of the three-dimensional printer.

Many of the above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory, any of which may serve as the controller described above or supplement processing of the controller with additional circuitry. This may also, or instead, include one or more application specific integrated circuits, programmable gate arrays, programmable array logic components, or any other device(s) that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

In other embodiments, disclosed herein are computer program products comprising computer-executable code or computer-usable code that, when executing on one or more computing devices (such as the devices/systems described above), performs any and/or all of the steps described above. The code may be stored in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the processes described above may be embodied in any suitable transmission or propagation medium carrying the computer-executable code described above and/or any inputs or outputs from same.

It will be appreciated that the methods and systems described above are set forth by way of example and not of limitation. Numerous variations, additions, omissions, and other modifications will be apparent to one of ordinary skill in the art. Thus, the order or presentation of method steps in the description and drawings above is not intended to require this order of performing the recited steps unless a particular order is expressly required or otherwise clear from the context.

While particular embodiments of the present invention have been shown and described, it will be apparent to those skilled in the art that various changes and modifications in form and details may be made therein without departing from the spirit and scope of the invention as defined by the following claims. The claims that follow are intended to include all such variations and modifications that might fall within their scope, and should be interpreted in the broadest sense allowable by law.

What is claimed is:

1. A device comprising:
    a print server coupled through a data network to a plurality of three-dimensional printers, the print server configured to receive status information from one or more sensors for each one of the plurality of three-dimensional printers and the print server configured to manage a print queue for each one of the plurality of three-dimensional printers;
    a database coupled in a communicating relationship with the print server and configured to store print queue data and status information for each one of the plurality of three-dimensional printers; and
    a web server configured to provide a user interface over the data network to a remote user, the user interface adapted to present the status information and the print queue data for one or more of the plurality of three-dimensional printers to the user and the user interface adapted to receive a print job from the remote user for one of the plurality of three-dimensional printers.

2. The device of claim 1 further comprising a processor configured to store a plurality of print jobs submitted to the web server in a log and to provide an analysis of print activity based on the log.

3. The device of claim 1 wherein the print queue is managed according to one or more criteria from the remote user for the print job.

4. The device of claim 1 wherein the one or more sensors include at least one video camera, the user interface adapted to present a video feed from the at least one video camera to the remote user through the user interface.

5. The device of claim 1 wherein the one or more sensors include one or more of a heat sensor, a volume flow rate sensor, a sound sensor, a light sensor, and a weight sensor.

6. The device of claim 1 wherein the print queue includes one or more print jobs for one of the plurality of three-dimensional printers and the print queue is stored in the database.

7. The device of claim 1 wherein the print queue includes one or more print jobs for one of the plurality of three-dimensional printers and the print queue is stored locally at the one of the plurality of three-dimensional printers.

8. The device of claim 1 wherein the print queue includes a plurality of print jobs for one of the plurality of three-dimensional printers and the print queue is allocated between the database and a local memory of the one of the plurality of three-dimensional printers.

9. The device of claim 1 wherein the print server stores a predetermined alternative three-dimensional printer to execute the print job from the remote user in the event of a failure by the one of the plurality of three-dimensional printers.

10. The device of claim 1 wherein the print server maintains exclusive control over at least one of the plurality of three-dimensional printers.

11. The device of claim 1 wherein the print server submits the print job to a first available one of the plurality of three-dimensional printers.

12. The device of claim 1 wherein the user interface is adapted to receive a manual selection of one of the plurality of three-dimensional printers from the remote user to execute the print job.

13. The device of claim 1 wherein the user interface is adapted to receive a batch print job from the remote user, the batch print job including a plurality of related print jobs.

14. The device of claim 13 wherein the user interface is further adapted to receive a specification of permissible allocations of the plurality of related print jobs among the plurality of three-dimensional printers.

15. The device of claim 1 wherein the user interface is adapted to display a current tool path of one of the plurality of three-dimensional printers that executes the print job.

16. The device of claim 1 wherein the user interface is adapted to display a three-dimensional model depicting a current state of completion of an object fabricated according to the print job.

17. The device of claim 1 wherein the status information presented in the user interface includes an image of a working volume of one of the three-dimensional printers that is executing the print job.

18. The device of claim 1 wherein the status information presented in the user interface includes a video image of a working volume of one of the three-dimensional printers that is executing the print job.

* * * * *